US006440241B1

(12) United States Patent
Mason et al.

(10) Patent No.: US 6,440,241 B1
(45) Date of Patent: *Aug. 27, 2002

(54) MULTILAYER FOAMS

(75) Inventors: Jeffrey John Mason, Bühlertal (DE); Chau Van Vo, Souffelweyersheim; Georges Eschenlauer, Soufflenheim, both of (FR)

(73) Assignee: Dow Global Technologies Inc., Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/190,516

(22) Filed: Nov. 12, 1998

(30) Foreign Application Priority Data

Dec. 8, 1997 (EP) .............................. 97121595

(51) Int. Cl.⁷ .................................................. B32B 5/18
(52) U.S. Cl. ..................................... 156/78; 156/244.11
(58) Field of Search ........................ 156/78, 79, 244.11, 156/77, 244.22, 244.25; 264/45.9, 45.4, 45.5, 45.8, 46.1, 46.2, 46.3; 428/159, 158

(56) References Cited

U.S. PATENT DOCUMENTS

| 3,557,265 A | * | 1/1971 | Chisholm et al. ........... 264/46.1 |
| 3,694,292 A | | 9/1972 | Schippers et al. |
| 3,720,572 A | * | 3/1973 | Soda et al. .................. 161/143 |
| 3,723,586 A | | 3/1973 | Foster et al. ................... 264/53 |
| 3,920,876 A | * | 11/1975 | Albert et al. ................ 428/295 |
| 3,949,031 A | | 4/1976 | Fairbanks ..................... 264/51 |
| 4,053,341 A | | 10/1977 | Kleiner et al. |
| 4,107,247 A | | 8/1978 | Dukess |
| 4,192,839 A | | 3/1980 | Hayashi et al. ............ 264/45.5 |
| 4,206,165 A | | 6/1980 | Dukess |
| 4,548,775 A | | 10/1985 | Hayashi et al. ............ 264/45.5 |
| 4,732,718 A | | 3/1988 | Jentet ......................... 264/45.5 |
| 4,753,841 A | | 6/1988 | Noel et al. .................. 428/174 |
| 4,773,448 A | | 9/1988 | Francis |
| 4,919,864 A | * | 4/1990 | Knaus ........................ 264/45.9 |
| 5,124,096 A | | 6/1992 | Brambilla ................... 264/45.5 |
| 5,132,062 A | | 7/1992 | Brambilla ................... 264/45.5 |
| 5,215,691 A | * | 6/1993 | Bland et al. ............... 264/45.9 |

FOREIGN PATENT DOCUMENTS

| CA | 1100726 | 6/1978 | |
| GB | 1230978 | 5/1971 | ........... B29D/27/00 |
| JP | 48-5100 | 1/1973 | |
| JP | 50-107067 | 1/1974 | |
| JP | 50-50473 | 5/1975 | |
| JP | 7-112480 | 5/1995 | |

* cited by examiner

*Primary Examiner*—Michael W. Ball
*Assistant Examiner*—Gladys Piazza

(57) ABSTRACT

The present invention concerns foamed products having a plurality of coalesced extruded layers or layers of coalesced strands of a foamed thermoplastic composition having a low density.

18 Claims, No Drawings

MULTILAYER FOAMS

FIELD OF THE INVENTION

The present invention relates to foamed products. More Particularly, the present invention relates to foamed products comprising a plurality of layers of a foamed thermoplastic composition having a low density.

BACKGROUND OF THE INVENTION

Methods for producing foams comprising a plurality of polymer layers are known. U.S. Pat. No. 4,053,341 discloses a process for producing a laminate comprising a plurality of cross-linked polyethylene foam layers having an anisotropic pore structure in at least one internal layer. The internal layer comprises a cross-linking agent and a large amount of blowing agent, whereas the external layers comprise a cross-linking agent and a small amount of blowing agent. The layers are welded at 160° C. and heated at 190° C. to 250° C. to foam the structure. A disadvantage of this process is that it requires two steps: first welding and cross-linking the extruded plastic layers, then foaming at a higher temperature. Further, the process is limited to the production of a multi-layer foam sheet with limited cross-section.

U.S. Pat. Nos. 4,107,247 and 4,206,165 and Canadian Patent 1,100,726 describe a method for the manufacture of a plastic sandwich element in which a first extruder produces a foamed cellular plastic at a defined temperature. A second extruder produces a solid plastic at a temperature at least 14° C. (25° F.) hotter than the temperature of the foamed cellular core to promote foaming of the core. The resulting sandwich is extruded through an extrusion die. A drawback of this process is that there is only one single central foam layer confined between two solid plastic films. Further, the resulting foam has comparatively poor insulation and dimensional stability properties.

U.S. Pat. No. 4,773,448 discloses a process for producing a plastic pipe with a hard outer shell lined with an inner shell of soft resilient plastic foam with a smooth axial passageway adapted to be a conduit for liquid. An outer PVC shell is extruded and an inner polyethylene foam material is simultaneously extruded inside the PVC tube. A disadvantage of this process is that the maximum cross-section is the size of the tube. Further, because of the restrained foaming it is expected that the resulting foam exhibits a very high foam density.

JP 50-107067 discloses a process for producing a thermoplastic foam having a non-foamed skin layer by using co-extrusion. A polyethylene foam having a polypropylene skin layer and a polystyrene foam having a polyethylene skin are prepared. A disadvantage of this process is that there is only one single central foam layer confined between two solid skin layers.

Japanese Pat. No. 48-5100 discloses a process for producing a multi-layer polystyrene foam having different foam densities, for example, high density outside, low density inside, and a reinforcement material in between. The material is used as pillars in homes, exhibiting desired bending and strength properties. A disadvantage of this process is that only foams having a comparatively high density of 200 kg/m$^3$ can be manufactured.

Japanese Pat. No. 50-50473 discloses a laminated molded product composed of a foam layer and a non-expanded thermoplastic layer. Both layers are molded into a desired shape. The lamination can take place separately using two extruders and two dies, or simultaneously using two extruders and one multilayer die. A disadvantage of the production process described therein is that only products having a small cross-section and a high density are obtained.

Laid-open Japanese Patent Application H7-112480 discloses a rectangular molded resin product composed of a hollow multilayer resin filled with a resin foam inside the hollow multilayer. The material for the hollow multilayer is polypropylene. The foam is polypropylene or polyurethane. The disadvantage of this manufacturing process is that the molded resin product can have one single foam layer only. Moreover, only products exhibiting a restricted rectangular cross-section and a high foam density can be produced.

U.S. Pat. No. 3,694,292 describes an extrusion head for producing a multilayer blown tubular film.

Generally it has to be noted that considerable problems arise with regard to corrugation of single layers when producing multilayer foams. Particularly, when producing multilayer foams which exhibit three or more foam layers, the foaming of the center layer or layers takes place in a different environment as compared to the outer layers.

Thus, there is a great need to provide a multilayer foam having excellent insulating and dimensional stability properties at a low density. It would also be desirable to provide a method for producing a multilayer foam which is simple, inexpensive and environmentally acceptable and results in products having good physical properties.

SUMMARY OF THE INVENTION

In one aspect, the present invention thus pertains to a method for producing a polymer or copolymer multilayer foam, comprising the steps of: (a) providing at least one foamable composition comprising at least one polymer or copolymer and a blowing agent formulation, (b) extruding the composition through a die having a plurality of orifices, (c) foaming the extruded composition at a foaming temperature which is above the glass-transition temperature or the melting temperature of the polymer composition, (d) maintaining the foaming product at an elevated temperature for a sufficient period of time to obtain adhesion between individual foam layers, and (e) allowing the foamed product to cool, characterized in that a foamed product is obtained comprising a plurality of adherent foam layers, wherein at least one of these foam layers extends across the whole breadth of the foamed product.

In a further aspect, the invention relates to a polymer or copolymer multilayer foam, obtainable by the method as described above. This product has excellent properties with regard to thermal insulation, dimensional stability, water diffusion resistance and water vapor permeation resistance. Furthermore, the foam of the present invention has a smooth, uniform surface equivalent to current monolithic foams. This preferred appearance is obtained on both sides of the final foam product without any additional surface-modifying operations.

DETAILED DESCRIPTION OF THE INVENTION

The foamable composition comprises at least one polymer or copolymer. The composition may comprise a single polymer, a single copolymer, mixtures of polymers, mixtures of copolymers or mixtures of polymers and copolymers.

According to the present invention a multilayer foam is composed of a plurality of polymer or copolymer foam layers. These foam layers may be comprised of the same or of different foamable compositions. The multilayer foam comprises at least two and preferably at least three foam layers. At least one of these foam layers is a homogeneous foam layer, that is, a monolithic foam part extending across the whole breadth of the foam. This homogeneous or monolithic foam layer is obtained by extruding the foamable composition through an orifice which extends across the whole breadth of the die, for example, a slit, or through a continuous orifice, for example, a circle.

The present invention relates to such multilayer foams composed of a variety of such monolithic layers, but also to such foams comprising at least one layer extending across the whole breadth of the foam and at least one layer which is comprised of a plurality of individual coalescent foam strands.

By means of the process for the production of multilayer foams according to the invention, it becomes possible to obtain foams having a greater overall thickness, or to produce them in a simpler manner. Moreover, the resulting multilayer foams have an oriented structure and offer an improved thermal insulation performance at the same density or thickness compared to monolithic foams. Furthermore, they exhibit an excellent dimensional stability and strength with similar or, more preferably, substantially equivalent water permeation resistance and water absorption properties as compared to monolithic foams.

It has been discovered that polymer or copolymer multilayer foams, for example, multilayer foams consisting of a plurality of monolithic layers or multilayer foams having one or more layers consisting of a plurality of individual coalesced strands can be produced on-line without using adhesive additives or any additional mechanical devices to enhance the adhesion between strands or layers.

The multilayer foam can be made from any foamable polymer or copolymer, for example, alkylene aromatic polymers, such as polystyrene or styrene-based copolymers, olefinic polymers or copolymers, such as, polyethylene, polypropylene or copolymers of polyethylene or polypropylene with other olefinic monomers, polyurethanes, acrylic polymers or any other plastic materials which can be foamed.

In a preferred embodiment the polymer or copolymer composition is comprised, exclusively or as part of a blend, of an alkylene aromatic polymer or copolymer. An alkylene aromatic polymer according to the present invention is preferably comprised of monovinylidene aromatic monomers. Preferred examples thereof are styrene, alkylstyrenes, for example, styrenes having at least one $C_1$–$C_4$ alkyl substituent located on the aromatic ring and/or on the vinylidene residue, and halogenated styrenes. Specific examples are styrene, α-methylstyrene, a styrene having at least one alkyl and/or halo substituent on the aromatic ring, such as o-methylstyrene, m-methylstyrene, p-methylstyrene, or the corresponding ethylstyrenes or chlorostyrenes, vinylxylene or mixtures thereof. An alkylene aromatic copolymer is comprised of alkylene aromatic monomers and other polymerizable monomers, wherein the alkylene aromatic monomers preferably are present in an amount of at least 50 percent by weight, more preferably in an amount of at least 70 percent by weight, and most preferably in an amount of at least 85 percent by weight based on the weight of the total monomers. The other polymerizable monomers preferably are selected from acrylic-monomers, for example, acrylonitrile, acrylic acid, and acrylic esters such as butyl acrylate, or from mono- or poly-unsaturated olefinic monomers, for example, ethylene, propylene, butadiene, and isoprene, or mixtures thereof.

According to a further preferred embodiment of the present invention the polymer or copolymer composition is comprised, solely or as part of a blend, of an olefinic polymer, for example, a polymer comprised of olefinic or poly-olefinic monomers. Preferred examples are homopolymers of ethylene or propylene, copolymers of ethylene or propylene with one or more $C_4$–$C_8$ α-olefins and inter- or copolymers of ethylene or propylene and at least one non-olefinic comonomer, wherein the olefinic monomers preferably are present in an amount of at least 50 percent by weight, more preferably in an amount of at least 70 percent by weight, most preferably in an amount of at least 85 percent by weight based on the weight of the total monomers. The non-olefinic polymerizable monomers preferably are selected from acrylic monomers, monovinylidene aromatic monomers or mixtures thereof.

The blowing agent in the method of the present invention can be selected from any known blowing agent suitable for the respective polymer, for example, from aliphatic or cycloaliphatic compounds including hydrocarbons, ethers, lower alcohols, halogenated hydrocarbons, especially partially halogenated hydrocarbons, and "inorganic" blowing agents such as water, carbon dioxide, nitrous oxides such as NO, $NO_2$ and $N_2O$, nitrogen, ammonia, noble gases such as argon and air, or mixtures thereof. Inorganic blowing agents can also be produced in situ by adding chemical compounds to the composition which decompose and generate gas, such as known typically in the art, for example, azo-type compounds for the generation of $N_2$, ammonium compounds of the generation of NH3 and mixtures of carbonates and acids for the generation of $CO_2$.

The blowing agent is generally used in an amount of from 0.5 to 25 weight percent, preferably of from 1 to weight percent based on the total weight of the foamable composition.

Examples of suitable aliphatic or cycloaliphatic compounds are ethane, ethylene, propane, propylene, butane, isobutane, butylene, isobutene, pentane, neopentane, isopentane, cyclopentane, hexane, heptane, cyclohexane and mixtures thereof. Suitable examples of ethers are dimethyl ether (DME), methyl ethyl ether, or diethyl ether. Suitable examples of lower alcohols are methanol, ethanol, propanol, isopropanol, butanol, pentanol, hexanol and mixtures thereof, wherein ethanol is preferred. Among the "inorganic" blowing agents, carbon dioxide or carbon dioxide/water mixtures are preferred. Examples of partially halogenated hydrocarbons are chloroethane, chlorodifluoromethane (R-22), 1-chloro-1,1-difluoroethane (R-142b), 1,1,1,2-tetrafluoroethane (R-134a), 1,1,2,2-tetrafluoroethane (R-134), 2-chloro-1,1,1,2-tetrafluoroethane (R-124), pentafluoroethane (R-125), 1,1-difluoroethane (R-152a), 1,1,1-trifluoroethane (R-143a), 1-fluoroethane (R-161), difluoromethane (R-32), 1,1,1,3,3-pentafluoropropane (HFC-245 fa), 1,1,1,3,3-pentafluorobutane (HFC-365 mfc) and mixtures thereof.

Preferable in all cases are blowing agent compositions which have no ozone depletion potential (ODP), namely fluorinated alkanes, inorganic blowing agents, alcohols, hydrocarbons, ethers or combinations thereof. Particularly suitable, for example, for alkylene aromatic polymers and copolymers, or for olefinic polymers and copolymers, are blowing agent compositions composed primarily of carbon dioxide, and mixtures of carbon dioxide with water or ethanol or isopropanol or dimethyl ether or mixtures of two or more of these. Compositions based on (i) 1,1,1,2-tetrafluoroethane, (ii) 1,1,2,2-tetrafluoroethane, (iii) 1,1-difluoroethane, (iv) mixtures of two or more of these, or (v)

mixtures of each compound or mixture with ethanol or isopropanol or dimethyl ether or water or carbon dioxide or mixtures of two or more of these are also particularly suitable in the practice of the present invention. Additionally, compositions based on dimethyl ether and mixtures of dimethyl ether with water or ethanol or isopropanol or carbon dioxide or mixtures of two or more of these are also suitable in the practice of the present invention. Other suitable blowing agents are hydrocarbons, such as propane, butane, pentane or mixtures thereof. Furthermore, mixtures of suitable hydrocarbons with dimethyl ether, carbon dioxide, and partially halogenated hydrocarbons are also suitable in the practice of the present invention.

When preparing the multilayer foam according to the present invention it is in some cases preferred that a control of the foam temperature based on the thermodynamic nature of the blowing agent formulation is carried out in steps (d) and (e) as described above. In some cases, when using a blowing agent formulation comprising a blowing agent or a mixture of blowing agents which exhibits a low evaporative cooling capacity during the foaming process, an accelerated cooling during step (e) of the process is preferred to obtain a product having excellent quality. Examples of suitable low evaporative cooling capacity blowing agents are carbon dioxide, nitrogen, noble gases, nitrous oxides and air. In contrast, when using a blowing agent formulation comprising a major amount of a blowing agent or a mixture of blowing agents which exhibits a high evaporative cooling capacity during the foaming process, it was found that an additional transfer of heat to the composition during step (d) was beneficial in some cases to obtain satisfactory results.

The additional transfer of heat can be accomplished, for example, by also heating the composition to a temperature above the foaming temperature as it passes through the extrusion die, or by heating the environment directly adjacent to the extrusion die face to such an extent that a sufficiently high foam surface temperature is maintained throughout the point in time at which the expanding foam structures coalesce. Said heating can be accomplished in various ways such as known in the art, all such that (a) the extrusion die structure, or (b) the individual foam strand surfaces are heated above the bulk foaming composition temperature.

Examples of blowing agents having a high evaporative cooling capacity are hydrocarbons, ethers, partially halogenated hydrocarbons, water or mixtures comprising as a major component at least one of such blowing agents.

It should be noted that in many cases the temperature control as described above is not an essential feature to obtain multilayer foam products having an excellent quality. However, especially when using a polymer or copolymer composition comprising an alkylene aromatic polymer or copolymer and when preparing a foam having at least one layer comprising a plurality of individual strands, the temperature control may be of great importance. A detailed description of the temperature control may be found in the co-pending application by the same applicants having the title, "Low Density Strand Foams."

Apart from the blowing agent, the composition may also comprise further additives, such as nucleating agents, extrusion aids, antioxidants, flame retardants, colorants, or pigments. Examples of pigments are carbon black or titanium dioxide or graphite and other compounds known in the art which may further enhance the thermal insulation properties of foamed products.

According to the present invention, foam structures comprising a plurality of layers and having a large cross-section can be produced. The present invention is particularly suitable for producing foamed products having excellent thermal insulation characteristics with cross-sections of at least 150 $cm^2$ or more, more preferably at least 500 $cm^2$ or more. It should, however, be noted that also foams having smaller cross-sections can be produced with the same advantages as previously described. The cross-sectional area of individual foam layers can be varied over a broad range. Usually the cross-section of a single foam layer is in the range of from 1 $cm^2$ up to 500 $cm^2$, preferably of from 2 $cm^2$ to 250 $cm^2$.

By the process as described above a cellular foam product can be obtained. In some cases, the cells of at least one foam layer may have an anisotropic shape, that is, the cell size is different when measured in different orientations (horizontal, vertical and extrusion).

Surprisingly, it was found that the polymer or copolymer composition can be substantially free from adhesive additives, for example, ethyl vinyl alcohol copolymer (EVA), ethyl acrylic acid copolymer (EAA), or other adhesive agents known in the art. Preferably, the adhesive additives are present in an amount lower than 5 weight percent, more preferably in an amount of lower than 1 weight percent based on the total polymer or copolymer composition. Most preferably, the composition is free from adhesive additives.

The use of adhesive additives, while not necessary for the easy production of, the final properties of or the excellent performance of the foams of this invention, may, however, be employed additionally such as is known in the art. Delivery methods of such adhesive additives would include mixing in the polymer, addition during any stage of the extrusion process or application of suitable adhesives during or after passage through the extrusion die, all such as known in the art.

According to the present invention, the polymer and blowing agents preferably are mixed in a mixer or in the extruder, and afterwards the mixed composition is cooled down prior to extrusion. Then, the composition, usually being in the form of a gel, is forced through a plurality of die orifices, preferably through a die plate comprising a plurality of openings, where at least one such opening is so designed that a monolithic foam layer extending across the whole breadth of the foam is produced. The individual foam layers can be planar or corrugated, discontinuous, for example, having ends, or continuous, for example, being in the form of a circle.

When a foam having at least one layer comprised of a plurality of individual strands is produced, the composition preferably is forced through a die plate comprising a plurality of small holes in a suitably desired spatial arrangement, for example, in an oscillating form such as a sinus wave, honeycomb, square, saw tooth or triangular saw tooth wave pattern.

According to the present invention it is preferred that the first contact between individual foam layers occurs after the departure from the respective die orifices. Further, it is preferred that the process according to the present invention is not carried out in a closed molding box but rather that a free molding of the foam product is conducted, optionally in an intermediate space between two plates. Furthermore, it is preferred in the process according to the invention that the total area of the openings of the dies used is $\leq 10$ percent, more preferably $\leq 5$ percent, and most preferably $\leq 3$ percent in relation to the cross-section transverse to the direction of extrusion of the resulting product.

In order to enhance the self-adhesion between individual layers or strands, the foaming temperature is above the glass transition temperature or the melting temperature of the polymer or copolymer. The difference in temperature is preferably 1° C. to 50° C., more preferably 2° C. to 40° C., and most preferably 5° C. to 30° C. Furthermore, it is preferred that the theoretical diameter of an individual strand (T) or the theoretical thickness of an individual layer (T) is at least as high as the distance between the orifices (D) or the distance between the slits (D). The ratio T/D which is designated as cohesion ratio (C) is thus preferably greater than or equal to 1, more preferably the cohesion ratio is greater than or equal to 1.2. The theoretical diameter of each strand or thickness of each layer can be calculated based on the foam volume expansion and the line speed determination. The foam volume can be calculated from mass balance and foaming temperature. It can also be deduced from the foam density measurement.

Further, the present invention comprises using conventional co-extrusion technology to co-extrude multiple polymer/blowing agent systems. The nature of each polymer or each blowing agent can be different. It is, however, important that the foaming temperature is above the glass-transition temperature or the melting temperature of each polymer or copolymer, and preferably the cohesion ratio is equal to or larger than 1.

When producing a multilayer foam comprising multiple polymer/blowing agent systems, the present invention comprises co-extruding a first polymer or copolymer through at least one slit of the multiorifice die and a second foamable polymer or copolymer through at least one second slit of the multiorifice die, whereby a foam composition is produced comprising at least one layer of the first polymer or copolymer foam and at least one layer of the second polymer or copolymer foam.

For example, the outer layers of a foam composition can be made of an olefinic polymer such as polypropylene with a hydrocarbon blowing agent, for example, butane, and the inner layer or layers are made with an alkylene aromatic polymer, such as polystyrene, and, for example, $CO_2$ and/or hydrofluorocarbons as blowing agent. The resulting composite foam offers a very good insulation value, thanks to the extruded polystyrene foam core, and a high service temperature and good chemical resistance due to the performance of the polypropylene outer shell.

A polymer or copolymer multilayer foam, for example, an alkylene aromatic and/or olefinic polymer or copolymer foam, which is obtainable by the method of the present invention preferably has a density of up to 150 kg/m$^3$. More preferably, the density is from 16 to 80 kg/m$^3$.

The expansion of the foam after leaving the extrusion die can be carried out in a normal atmospheric environment. For the expansion, however, also a sub-atmospheric environment, for example, partial vacuum, a super-atmospheric environment, for example, overpressure, and atmospheres having various gaseous compositions, for example, an elevated $CO_2$ content, can be selected, such as is known in the art.

The foamed product may be transported by various conveying devices as known in the art, for example, continuous belts, or rollers. These devices may additionally comprise means for temperature control as appropriate.

Further, the foamed product which is produced according to the present invention is suitable for use in processes involving devices for reducing density after initial foam expansion, for example, infrared ovens, steam ovens, hot air ovens, or combinations of such devices.

If desired, the foamed product can be subjected to post-treatment procedures, such as embossing, remelting and other techniques known in the art to modify the outer surface of the foamed product. It should, however, be noted that according to the present invention a product with a smooth, uniform surface substantially equivalent to current monolithic foams is obtained, which in many cases does not require any surface-modifying operations.

By using the present invention, a foam having a large cross-section and a low density can be produced. This invention is suitable for production of foams with an average cell size ranging from 25 to 3000 micrometers ($\mu$m), preferably 50 to 2000 $\mu$m, and more preferably 100 to 1500 $\mu$m. This foam presents a superior thermal insulation performance and dimensional stability in comparison with the foams of the prior art.

The multilayer foam according to the present invention preferably has an improvement in the thermal conductivity by at least 1.5 percent, more preferably by at least 3 percent, and most preferably by at least 5 percent over a monolithic foam having the same density and thickness and produced from the same polymer/blowing agent composition. "Monolithic" as used herein means a single, integral unit.

A preferred feature of the process and resulting foam according to the present invention is that at least one layer of the foam structure is composed of a plurality of closed-cells, preferably a closed-cell content as measured by ASTM D 2856-90 of at least 90 percent, and more preferably at least 95 percent. More preferably, all layers of the foam product are composed of a substantially closed-cell foam.

A further advantage of the foam according to the present invention over the prior art foams is that continuous layers in the direction of extrusion can be obtained. Further, it is preferred that according to the present invention the interface between individual strands or layers substantially does not exhibit any zones or only very small zones having an increased foam density.

A further preferred feature of the foam according to the present invention is that a minimum tensile strength, for example, as measured by ASTM D-1623 of at least 20 kPa, more preferably of at least 100 kPa and most preferably 250 kPa or higher is obtained. Further, the shear strength of the foamed product, for example, as measured by ASTM C-273 is preferably at least 10 kPa, more preferably at least 100 kPa and most preferably 250 kPa or higher.

A further preferred feature of a foam according to the present invention is that there are substantially no voids when cutting the foam perpendicular to the direction of extrusion. Preferably, the void area is less than 1 percent, and more preferably less than 0.5 percent based on the total cross-section of the foam. Most preferably, there are no voids at all.

The substantially voidless multilayer foams have at least substantially equal water vapor permeability and water diffusion resistance as comparable monolithic foams.

The following examples are for illustrative purposes only and do not limit the scope of the invention. Unless otherwise stated, all parts and percentages are given by weight.

EXAMPLE 1

A multilayer foam (Sample ML1) was produced using a 5.08 cm (2 inch) extruder, consisting of a polymer-copolymer blend with a glass transition temperature of 103° C., composed of 90 phr (parts per 100 of resin) polystyrene, 10 phr styrene-α-methyl-styrene copolymer, 0.8 phr of additives, comprising of extrusion aids and colorants, and 4.5 phr of carbon dioxide. The foaming temperature was set at 114° C. The gel was extruded into atmospheric pressure through a plate of 3 slits having a slit opening height of 1.0 mm. The distance between the slit centers was 17.0 mm. The multilayer foam composed of 3 foam layers was produced without any adhesive material. The foam had a density of 39.3 kg/m$^3$, a cell size of 0.30 mm (vertical), 0.23 mm (extrusion) and 0.29 mm (horizontal) and a cross-section of 11,600 mm$^2$. The cohesion ratio C (the ratio of the thickness of individual layer and the distance between slit centers) was 1.38.

Another multilayer foam (Sample ML2) was prepared using the process as described above, but using 4.6 phr $CO_2$, a slit opening height of 0.9 mm and a distance between slit centers of 12.7 mm. The density of this foam was 45.6 kg/m$^3$, cell size 0.16 mm (vertical), 0.12 mm (extrusion) and 0.12 mm (horizontal). The cross-section was 7,020 mm$^2$ and the cohesion ratio C was 1.36.

A further multilayer foam (Sample ML3) was prepared using the formulation as described above, but using a 8.9 cm (3.5 inch) extruder and a plate having five open slits. The density of this foam was 38.6 kg/m$^3$, the cell size was 0.35 mm (vertical), 0.2 mm (extrusion) and 0.28 (horizontal). The cross-section was 30,000 mm$^2$ and the cohesion ratio C was 1.81.

The data are shown in Table I. Samples ML1, ML2 and ML3 clearly show that excellent performance in mechanical strength, interlayer adhesion, thermal insulation performance, dimensional stability, and resistance to water permeation and diffusion were achieved by the process described in this invention.

EXAMPLE 2

A multilayer foam (Sample ML4) was produced using a 1.9 cm (¾ inch) extruder and using polystyrene as polymer and a mixture of HFC-134a and ethanol as blowing agent. The 3-layer foam produced had a low density and showed excellent interlayer adhesion. The data are shown ain Table II.

EXAMPLE 3

A polyethylene multilayer foam was produced using a 1.9 cm (¾ inch) extruder and using HCFC-142b as blowing agent (Sample ML5). The 3-layer foam produced showed excellent interlayer adhesion. The data are shown in Table II.

EXAMPLE 4

A polystyrene multilayer foam was produced using a 1.9 cm (¾ inch) extruder, carbon dioxide as the blowing agent and carbon black as the additive (Sample ML6). The 3-layer foam produced had a low density and showed excellent interlayer adhesion. The data are shown in Table II.

TABLE I

|  | Unit | Sample ML1 | Sample ML2 | Sample ML3 |
|---|---|---|---|---|
| PROCESS DATA |  |  |  |  |
| PS | phr | 90 | 90 | 90 |
| SaMS | phr | 10 | 10 | 10 |
| Additive | phr | 0.8 | 0.85 | 1.4 |
| HBCD (fire retardant) | phr | 0 | 0 | 2.5 |
| $CO_2$ | phr | 4.5 | 4.6 | 4.7 |
| Slit opening, h | mm | 1.0 | 0.9 | 0.9 |

TABLE I-continued

|  | Unit | Sample ML1 | Sample ML2 | Sample ML3 |
|---|---|---|---|---|
| Distance between slit centers, D | mm | 18.0 | 13.6 | 13.6 |
| Number of slits open, n | slits | 3 | 3 | 5 |
| Foaming temperature | ° C. | 114 | 114 | 117 |
| Foam density, fresh | kg/m$^3$ | 40.4 | 44 | — |
| Foam cell size | mm | 0.3 | — | — |
| Foam volume, V | mm$^3$/s | — | 512000 | 1110000 |
| Foam linear speed, L | mm/s | — | 73 | 37 |
| Foam board cross-section, S | mm$^2$ | 11600 | 7020 | 30000 |
| Layer Thickness, T | mm | 23.5 | 17.3 | 23 |
| Cohesion ratio, T/D |  | 1.31 | 1.27 | 1.69 |
| FOAM PROPERTIES |  |  |  |  |
| Void content | % | 0 | 0 | <1% |
| Foam thickness | mm | 70 | 53 | 115 |
| Aged density | kg/m$^3$ | 39.3 | 45.6 | 39.4 |
| Cell size, vertical | mm | 0.30 | 0.16 | 0.33 |
| Cell size, extrusion | mm | 0.23 | 0.12 | 0.27 |
| Cell size, horizontal | mm | 0.29 | 0.12 | 0.34 |
| Closed cell content | % | 94 | >99.7 | 95.1 |
| Compressive strength, vertical | kPa | 355 | 450 | 260 |
| Compressive strength, extrusion | kPa | 230 | 550 | 265 |
| Compressive strength, horizontal | kPa | 215 | 305 | 175 |
| Tensile strength, full specimen | kPa | 105 | 375 | — |
| Shear strength, extrusion | kPa | 190 | 380 | — |
| Lambda value, 10° C. | mW/m · K | 34.8 | 34.5 | 33.9 |
| DIN 18164, WD test at 30 days, average | % | 1.2 | 1 | 2.1 |
| Water vapor permeance, SIA 279 | $\mu$-value | — | 149 | — |
| Water pickup, by immersion, SIA 279 | % vol | 0.65 | 0.20 | — |
| Freeze-thaw water pickup, SIA 279 | % | 2.4 | 0.82 | — |

TABLE II

|  | Unit | Sample ML4 | Sample ML5 | Sample ML6 |
|---|---|---|---|---|
| PROCESS DATA |  |  |  |  |
| Polymer | type | PS | PE | PS |
| Additive | phr | 0.9 | 0.2 | 0.9 |
| Carbon black | phr | — | — | 5 |
| Carbon dioxide | phr | — | — | 4.7 |
| HCFC-142b | phr | — | 12 | — |
| HFC-134a | phr | 6 | — | — |
| Ethanol | phr | 1.4 | — | — |
| Slit opening, h | mm | 0.5 | .06 | 0.6 |
| Distance between slit centers, D | mm | 6.2 | 6.3 | 6.3 |
| Number of slits open, n | slits | 3 | 3 | 3 |
| Foaming temperature | ° C. | 127 | 109 | 126 |
| Foam density, fresh | kg/m$^3$ | 44 | 55 | 44 |
| Foam board cross-section, S | mm$^2$ | 700 | 300 | 550 |
| FOAM PROPERTIES |  |  |  |  |
| Void content | % | 0 | 0 | 0 |
| Foam thickness | mm | 22.5 | 10.5 | 19.2 |

EXAMPLE 5

The thermal conductivity of a multilayer polystyrene foam versus two monolithic polystyrene foams was tested.

In all cases a polystyrene formulation with carbon dioxide as blowing agent was used. The foaming conditions were the same in all cases.

The results are shown in Table III. The multilayer foam, showing an improvement in thermal conductivity of 4–4.2 percent, clearly illustrates the advantage that foams of the present invention demonstrate when compared to foams produced by means of the prior art.

TABLE III

|  | Multilayer foam | Monolithic foam | |
| --- | --- | --- | --- |
| Average thickness, mm | 115 | 120 | 120 |
| Cell size, thickness direction, mm | 0.33 | 0.3 | 0.36 |
| Aged foam density, kg/m$^3$ | 39.4 | 39.8 | 36.7 |
| Thermal conductivity, mW/m · K, 10° C. mean temperature, 90 days age | 33.9 | 35.3 | 35.4 |

EXAMPLE 6

The dimensional stability and water permeation resistance of a multilayer foam (Sample ML2) versus a monolithic polystyrene foam was tested. In all cases a polystyrene formulation with carbon dioxide as a blowing agent was used. The foaming conditions were the same in all cases.

The results are shown in Table IV. A direct comparison of multilayer foam ML2 with a monolithic foam of similar density and vertical cell size showed that the multilayer foam had improved water permeation resistance ("$\mu$-value") and better dimensional stability (as measured by DIN 18164) versus a similar monolithic foam.

TABLE IV

|  | Multilayer foam (ML2) | Monolithic foam |
| --- | --- | --- |
| Average thickness, min | 53 | 50 |
| Aged foam density, kg/m$^3$ | 45.6 | 44.5 |
| Vertical cell size, mm | 0.16 | 0.18 |
| Dimensional change, DIN 18164, WD test at 30 days age, average % | 1.0 | 1.1 |
| Resistance to water vapor permeation, SIA 279, $\mu$-value | 149 | 130 |

EXAMPLE 7

A multilayer foam having a center layer comprising a plurality of individual strands was produced using polystyrene as polymer and carbon dioxide as blowing agent. The data are shown in Table V. This multilayer foam demonstrates that one or more layers of the foam structure can be composed of multiple strands while maintaining the capacity to make a low density, zero void content foam with good interlayer and interstrand adhesion.

TABLE V

|  | Unit | Sample |
| --- | --- | --- |
| PROCESS DATA |  |  |
| Polymer | type | PS |
| Additive | phr | 0.6 |
| Carbon dioxide | phr | 4.5 |
| Slit opening, h | mm | 0.6 |
| Distance between slit centers, D | mm | 6.3 |
| Number of slit rows | slits | 3 |
| Top/bottom slit, number of openings |  | 1 |
| Center slit, number of openings |  | 3 |
| Left/right side openings, width | mm | 1.6 |
| Center opening, width | mm | 2.6 |
| Foaming temperature | ° C. | 127 |
| Foam density, fresh | kg/m$^3$ | 42.6 |
| Foam volume, V | mm$^3$/s | 24000 |
| Foam linear speed, L | mm/s | 22 |
| Foam board cross-section, S | mm$^2$ | 660 |
| Layer thickness, T | mm | 7.5 |
| Size of interstrand cavities | mm$^2$ | none |

What is claimed is:

1. A method for producing a multilayer foam comprising the steps of:
    (a) providing at least one foamable composition comprising at least one polymer or copolymer and a blowing agent formulation,
    (b) extruding the foamable composition of step (a) through a die having a plurality of orifices,
    (c) foaming the extruded foamable composition of step (b) at a foaming temperature which is above the glass-transition temperature or the melting temperature of the polymer composition to make individual foaming layers,
    (d) maintaining the individual foaming layers of step (c) at an elevated temperature for a sufficient period of Time and contacting the individual foaming layers with each other to obtain adhesion between the individual foaming layers, and
    (e) allowing the product of step (d) to cool,
wherein the plurality of orifices of step (b) comprises at least one orifice so designed that at least one monolithic foam layer extending across the whole breadth of the product of step (d) is produced, the first contact between the individual foaming layers according to step (d) is after step (b), and the product of step (e) has a density in the range from 16 to 80 kg/M$^3$ and comprises a plurality of foam layers adhered directly to each other, wherein at least one of these foam layers is a monolithic foam layer extending across the whole breadth of the product of step (e).

2. The method of claim 1, wherein the at least one polymer or copolymer of step (a) is selected from alkylene aromatic polymers or copolymers and olefinic polymers or copolymers and mixtures thereof.

3. The method of claim 1 wherein the blowing agent is selected from hydrocarbons, ethers, lower alcohols, partially halogenated hydrocarbons, water, carbon dioxide, nitrous oxides, nitrogen, ammonia, air, noble gases and mixtures thereof.

4. The method of claim 1, wherein the product of step (e) comprises at least three foam layers.

5. The method of claim 4, where the blowing agent exhibits a low evaporative cooling capacity during the foaming process, and step (e) includes an accelerated cooling of the product of step (d).

6. The method of claim 1, wherein the total area of the orifices is less than or equal 10 percent of a cross-section of the die transverse to a direction of extrusion.

7. The method of claim 1, wherein the at least one polymer or copolymer of step (a) contains less than 1 weight-percent adhesive additives.

8. The method of claim 1, wherein the foaming temperature is 1° C. to 50° C. above the glass-transition temperature or melting temperature of the at least one polymer or copolymer.

9. The method of claim 1, wherein step (a) comprises providing a first polymer or copolymer and a second polymer or copolymer and step (b) comprises co-extruding the first polymer or copolymer through at least one first orifice of the die, and the second polymer or copolymer through at least one second orifice of the die, wherein the first polymer or copolymer is different from the second polymer or copolymer, and whereby a multilayer foam is produced comprising at least one foam layer of the first polymer or copolymer and at least one foam layer of the second polymer or copolymer.

10. The method of claim 9, wherein the first polymer or copolymer comprises polypropylene and the second polymer or copolymer comprises polystyrene.

11. The method of claim 10, wherein the first polymer or copolymer is co-extruded as outer layers.

12. The method of claim 1, wherein the polymer or copolymer comprises an alkylene aromatic polymer.

13. The method of claim 12, wherein the alkylene aromatic polymer is polystyrene.

14. The method of claim 13, wherein the blowing agent comprises carbon dioxide.

15. The method claim 13, wherein the plurality of foam layers includes at least one layer consisting of a plurality of individual coalesced strands.

16. The method of claim 13, wherein a plurality of the orifices of step (b) are so designed that a plurality of monolithic foam layers extending across the whole breadth of the product of step (d) is produced.

17. The method of claim 14, wherein a plurality of the orifices of step (b) are so designed that a plurality of monolithic foam layers extending across the whole breadth of the product of step (d) is produced.

18. The method of claim 15, wherein a plurality of the orifices of step (b) are so designed that a plurality of monolithic foam layers extending across the whole breadth of the product of step (d) is produced.

* * * * *